United States Patent
Todasco (10) Patent No.: US 10,379,709 B2
(45) Date of Patent: Aug. 13, 2019

(54) ELECTRONICALLY ANALYZING USER ACTIVITY ON A GRAPHICAL USER INTERFACE

(71) Applicant: PAYPAL, INC., San Jose, CA (US)

(72) Inventor: Michael Charles Todasco, Santa Clara, CA (US)

(73) Assignee: PayPal, Inc., San Jose, CA (US)

( * ) Notice: Subject to any disclaimer, the term of this patent is extended or adjusted under 35 U.S.C. 154(b) by 520 days.

(21) Appl. No.: 15/094,812

(22) Filed: Apr. 8, 2016

(65) Prior Publication Data

US 2017/0293407 A1 Oct. 12, 2017

(51) Int. Cl.
*G06F 3/13* (2006.01)
*G06F 3/0484* (2013.01)
*G06F 3/01* (2006.01)

(52) U.S. Cl.
CPC ............ *G06F 3/0484* (2013.01); *G06F 3/015* (2013.01); *G06F 3/016* (2013.01); *G06F 3/13* (2013.01)

(58) Field of Classification Search
None
See application file for complete search history.

(56) References Cited

U.S. PATENT DOCUMENTS

| | | | | |
|---|---|---|---|---|
| 5,996,011 A * | 11/1999 | Humes | .............. | G06F 17/30867 707/E17.109 |
| 7,120,880 B1 * | 10/2006 | Dryer | .................... | G06Q 30/02 715/863 |
| 9,256,785 B2 | 2/2016 | Qvarfordt | | |
| 9,478,143 B1 * | 10/2016 | Bowen | ...................... | G09B 5/06 |
| 9,916,010 B2 * | 3/2018 | Harris | ...................... | G06F 3/017 |
| 10,063,560 B2 * | 8/2018 | Gordon | .............. | G06K 9/00617 |
| 2009/0024964 A1 * | 1/2009 | Kantamneni | .......... | G06Q 30/02 715/854 |
| 2009/0146775 A1 * | 6/2009 | Bonnaud | ................. | G06F 9/453 340/3.1 |
| 2010/0039618 A1 * | 2/2010 | De Lemos | .............. | A61B 3/113 351/209 |
| 2011/0096960 A1 * | 4/2011 | Britz | ........................ | G02B 3/14 382/117 |
| 2012/0001923 A1 * | 1/2012 | Weinzimmer | .......... | G06F 3/013 345/473 |
| 2013/0054576 A1 * | 2/2013 | Karmarkar | ........ | G06F 17/30861 707/722 |
| 2013/0177878 A1 * | 7/2013 | Rodriquez | ......... | G09B 19/0053 434/118 |
| 2013/0340006 A1 * | 12/2013 | Kwan | .................... | H04N 5/445 725/39 |

(Continued)

*Primary Examiner* — Jennifer N To
*Assistant Examiner* — Beau D Spratt
(74) *Attorney, Agent, or Firm* — Haynes & Boone LLP (57) ABSTRACT

Systems and methods that help ensure that content on a webpage is read and understood by analyzing user activity on a graphical user interface are described. As a user views and interacts with a webpage, activity of the user is monitored. For example, data associated with eye movement, brainwave activity, lip movement, eyebrow movement, and/or forehead wrinkling is collected. This data is then analyzed to determine if the user read and understood the content presented. Should the user fail to read and/or comprehend the content, the user may be alerted and/or prevented from proceeding or accessing additional content.

20 Claims, 5 Drawing Sheets

(56) References Cited

U.S. PATENT DOCUMENTS

| | | | |
|---|---|---|---|
| 2014/0109186 A1* | 4/2014 | Oikonomidis | G06F 21/6218 726/4 |
| 2015/0131850 A1* | 5/2015 | Qvarfordt | G06K 9/00617 382/103 |
| 2016/0022167 A1* | 1/2016 | Simon | A61B 5/04842 600/301 |
| 2016/0210371 A1* | 7/2016 | Akolkar | G06F 3/013 |
| 2016/0239468 A1* | 8/2016 | Capt | G06F 3/04842 |
| 2017/0154177 A1* | 6/2017 | Tsou | G06F 21/32 |
| 2017/0277360 A1* | 9/2017 | Breedvelt-Schouten | G06F 3/013 |
| 2017/0300686 A1* | 10/2017 | Shyu | G06K 9/72 |

\* cited by examiner

TERMS AND CONDITIONS

BEFORE COMPLETING AND SUBMITTING THE FORM TO COMPANY, YOU MUST READ AND AGREE TO THE TERMS AND CONDITIONS BELOW.

ELECTRONICALLY ANALYZING USER ACTIVITY ON A GRAPHICAL USER INTERFACE

BACKGROUND

The present invention generally relates to monitoring a user's activity on a graphical user interface (GUI), and more specifically to the use of data associated with a user's activity on a GUI, including movement, to ensure that data on a webpage is read and understood.

People will often fail to read important text on a webpage before proceeding to agree with certain terms and conditions or creating an account. For example, a person can skim through text and push buttons to proceed to the next page without even knowing what he or she agreed to. This can cause problems when the person later complains that he or she did not know what he or she agreed to and attempts to void his or her previous actions with a company or that the person ends up being bound by something they were unaware they agreed to. Time and energy must then be wasted canceling, for example, an unintended consequence of the person's actions, and both the person and the company are unhappy. If the agreement cannot be canceled, the customer may end up unhappy to be bound by something they were not aware of.

Accordingly, a need exists for systems and methods that provide a mechanism to prevent the above-described problems from occurring.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure is directed to ensuring that a user reads and understands web content displayed on a GUI by analyzing the user's interactions with content displayed on the GUI. Specialized devices, such as cameras, eyeglasses, and headgear, may be used to track activity of a user. As used herein, "activity" means behavior, functions, actions, and/or movement associated with a user. Examples of activity include eye movement, brainwave activity, lip movement, eyebrow movement, and forehead wrinkling. Should a user fail to read and/or comprehend web content presented on a GUI, the user can be alerted and/or prevented from proceeding or accessing additional content.

If it is detected that a user is not reading an important instruction or information, the system can alert the user in various ways that he or she needs to read it. For example, the webpage containing the information can be locked or frozen until the user has spent a sufficient time reading the instruction or information; the user may be allowed to fill out certain information for a next step, but then may be prevented from proceeding (e.g., clicking a continue button) until it is determined that the user has read the instruction or information; fields that need to be filled out or buttons that need to be pressed to proceed may be hidden or otherwise inactive (e.g., data cannot be entered into the field) until the user has read the instruction or information; and/or an intrusive visual and/or audio element can be introduced on the display (e.g., a dancing mascot can move across the screen reminding the user to read the text). In various embodiments, the alert is purely audio (e.g., a voice is provided that instructs the user to read the instruction or information). All of these features can be programmed and included in code for a webpage providing text or data.

In addition, a secondary user device that does not display the webpage (e.g., a wearable device) may be used to alert the user that he or she is required to read and understand the text. In various embodiments, an audio and/or visual notification is sent to the secondary user device. For example, a message can be sent to the secondary device that encourages the user to slow down and read the instruction or information. In several embodiments, the secondary user device may emit a ring tone, play an audio message, and/or provide output including sounds, music, audio, video, images, and/or tactile (e.g., vibration) alerts. Use of a secondary device to alert the user breaks the flow of what the user is doing by encouraging the user to step away and check a secondary device.

Eye movement is one kind of activity that can be monitored to determine whether a user has read and understood text or other data. Eye tracking technology is used to keep a record of where on a display or screen a user is looking or if the user is even looking at the display or screen. When a user interacts with a user interface or reads a webpage, the user is engaged in a range of activities, including reading, selecting, inspecting parts of an image, and so on. Some eye tracking technology can capture what a user pays attention to and for how long, or classify if a user is reading text. In various embodiments, the systems and methods described herein can determine if a person is reading a piece of important information, just staring at the location of the information without reading it, or simply just skipping or moving onto the next content.

Devices capable of eye tracking can detect and measure eye movements, and identify a direction of a user's gaze or line of sight on a screen. In some embodiments, cameras are used to track eye movement to determine if someone is paying attention to text. If a user spends only a few seconds looking at the text, the user can be given an audible prompt or popup on the screen, and be prevented from moving forward to the next page until the user reviews the text for a longer period of time. Individual eye tracking data can be used to determine whether the user actually looked at and reviewed a particular region of a webpage.

In several embodiments, the systems and methods described herein monitor the areas that a user views. The duration that a user views a particular area of content, the pattern or order that a user views content, and the dilation of the user's eyes when viewing specific areas of content may also be monitored. Pupil dilation can also be used to measure comprehension, recognition or attention to text.

The measurement or tracking process may be terminated when the user clicks on a new page or when a predetermined time period expires. The monitoring and tracking process generally includes monitoring the pupil dilation of the user. The dilation of the user pupil may be used to determine how well the user comprehends the space being viewed, e.g., larger pupil size would generally represent that the user does not comprehend the area being viewed. Similarly, smaller pupil sizes would indicate that the user is not having a problem understanding or comprehending the information being viewed.

Brainwave activity is another kind of activity that can be monitored to ensure that information is read and understood. The brain is an electrochemical organ, and the electrical activity that emanates from the brain comes in the form of brainwaves. Brainwave detection and monitoring can be used to detect what areas of the brain are functioning, and to some extent, detect what a person is thinking. This information can be utilized in many useful applications.

There are four main categories of brainwaves that are experienced by human beings. People emit beta brainwaves when the brain is aroused and engaged in mental activities, such as reading. A predominance of beta brainwaves is associated with being alert, active, and concentration on learning something or doing an activity that requires focus, such as reading. When the brain is aroused and actively engaged in mental activities, it generates beta brainwaves. If a user is engaged in a task such as reading, other brainwave activity tends to become suppressed and beta brainwaves begin to dominate. These beta brainwaves are of relatively low amplitude, and are the fastest of the four different brainwaves.

In contrast, alpha brainwaves represent non-arousal and calmness. Theta brainwaves are often induced by things of a repetitious nature when our actions become so automatic that our mind disengages. A person who takes time off from a task and begins to daydream is often in a theta brainwave state. Delta brainwaves are experienced when in a deep dreamless sleep.

In certain embodiments, a wearable device, such as a headband or headset including various electrode sensors, is used to read brainwaves of a user. For example, MUSE™, the brain sensing headband, the Emotiv Insight Brainwear® headset, and the Emotiv EPOC neuroheadset are suitable wearable devices that may be used to collect brainwaves. The type of brainwaves detected can indicate whether a user is paying attention to, reading, and understanding web content. For example, if beta brainwaves are measured, it can be inferred that the user is reading and trying to comprehend text since beta brainwaves are associated with focus and mental thinking. On the other hand, if theta brainwaves are detected, it can be inferred that the user is not reading text since theta brainwaves are present during daydreaming.

Lip movement is yet another activity that can be monitored. Lip movement while reading can indicate that a user is showing effort to understand and concentrate on text. In some embodiments, a camera can capture images of a user's lips as the user mouths out words while he or she is reading. In various embodiments, the words that the user is mouthing are converted to text and compared to text on a webpage to determine whether the user was in fact reading the text.

Forehead wrinkling is often connected to eyebrow movement, and are additional activities that can be monitored. In several embodiments, cameras are used to capture a user wrinkling his or her forehead and moving his or her eyebrows to indicate concentration.

Algorithms and other equations are typically applied to the user activity data. When viewing the present disclosure as a whole, however, the combination of all the steps taken together as described in detail below, amount to significantly more than simply using the algorithms because they add meaningful limits on use of the algorithms. The present disclosure does not merely use the algorithms in isolation, but integrates these algorithms into a process of analyzing user activity. The additional steps in the process specifically relate to how the results of the algorithms are used to prevent a user from proceeding to additional content and/or alert the user. The totality of the steps act in concert to improve another technical field, specifically the field of analyzing user interactions with specific content on a GUI. Thus, the subject matter of the present disclosure amounts to significantly more than mathematical relationships and algorithms.

Figure 1:
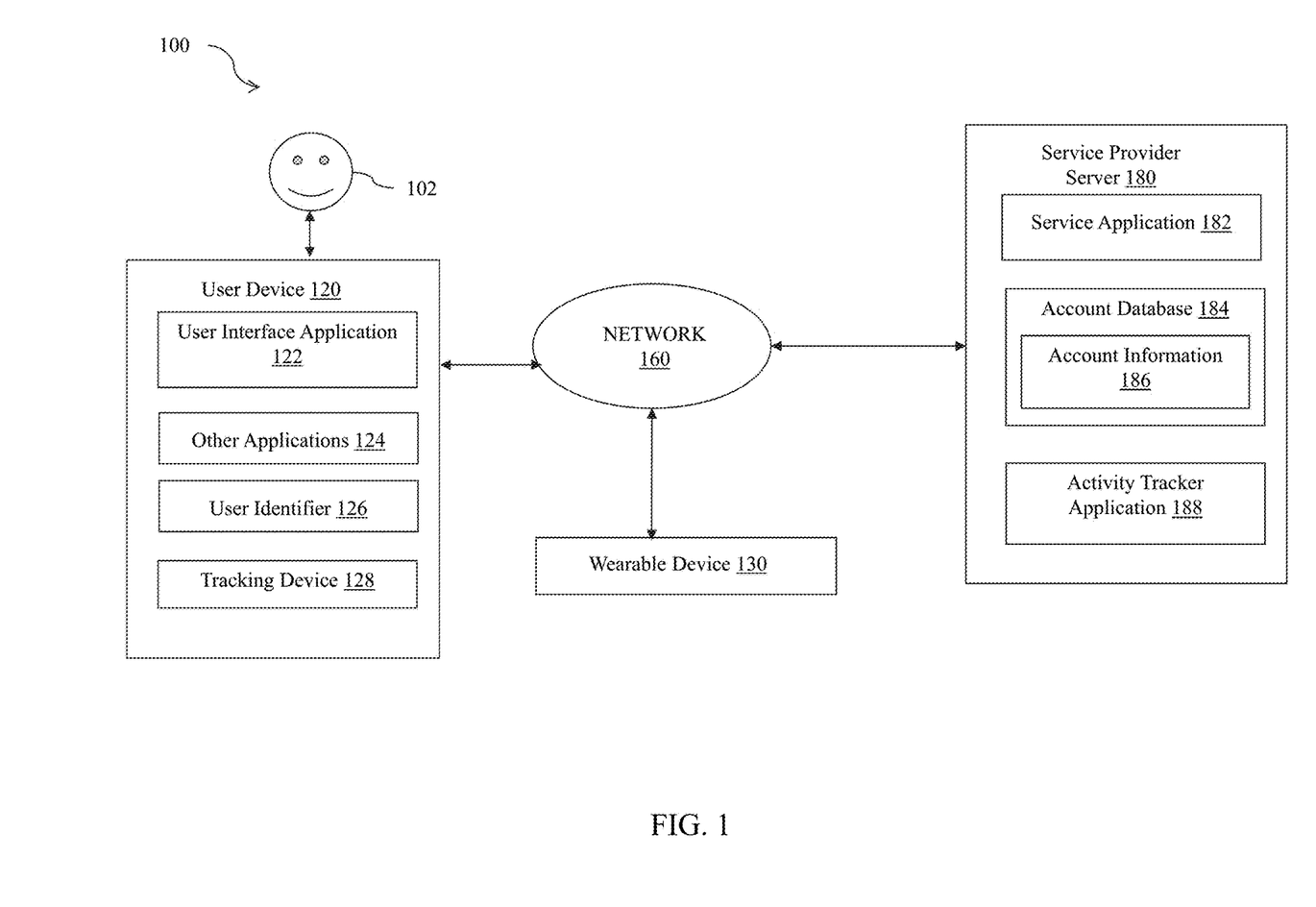
FIG. 1 is a block diagram illustrating a system for analyzing user activity on a GUI according to an embodiment of the present disclosure.

FIG. 1 shows one embodiment of a block diagram of a network-based system 100 that is configured to analyze user activity on a GUI ensure information is read and understood according to an embodiment of the present disclosure. Any of the systems or machines shown in FIG. 1 may be, include, or otherwise be implemented in a special-purpose (e.g., specialized or otherwise non-generic) computer that has been modified to perform one or more functions described herein for that system or machine. As shown, system 100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

As shown in FIG. 1, system 100 includes a user device 120 (e.g., a smartphone or desktop computer), a wearable device 130, and a service provider server or device 180 (e.g., network server device) in communication over a network 160. Network 160, in one embodiment, may be implemented as a single network or a combination of multiple networks. For example, in various embodiments, network 160 may include the Internet and/or one or more intranets, landline networks, wireless networks, and/or other appropriate types of communication networks. In another example, network 160 may comprise a wireless telecommunications network (e.g., cellular phone network) adapted to communicate with other communication networks, such as the Internet.

User device 120, in one embodiment, is utilized by a user 102 to interact with service provider server 180 over network 160, for example to view content on a webpage created by service provider server 180. User device 120, in various embodiments, may be implemented using an appropriate combination of hardware and/or software configured for wired and/or wireless communication over network 160 and for performing the functions described herein. In various implementations, user device 120 may include at least one of a smartphone, wireless cellular phone, satellite phone, tablet (e.g., iPad™ from Apple®), laptop computer, desktop computer, notebook computer, and/or other types of computing devices.

User device 120, in one embodiment, includes a user interface application 122, which may be utilized by user 102 to access applications and to provide instructions to service provider server 180 over network 160. In one aspect, user 102 may log in to an account related to user 102 via user interface application 122.

In one implementation, user interface application 122 comprises a software program, such as a graphical user interface (GUI), executable by a processor that is configured to interface and communicate with service provider server 180 via network 160. In another implementation, user interface application 122 comprises a browser module that provides a network interface to browse information available over network 160. For example, user interface application 122 may be implemented, in part, as a web browser to view information available over network 160.

User device 120, in various embodiments, may include other applications 124 as may be desired in one or more embodiments of the present disclosure to provide additional features available to user 102. In one example, such other applications 124 may include security applications for implementing client-side security features, calendar application, contacts application, location-based services application, programmatic client applications for interfacing with appropriate application programming interfaces (APIs) over the network 160, and/or various other types of generally known programs and/or software applications. In still other examples, other applications 124 may interface with user interface application 122 for improved efficiency and convenience.

User device 120, in one embodiment, may include at least one user identifier 126, which may be implemented, for example, as operating system registry entries, cookies associated with user interface application 122, identifiers associated with hardware of user device 120, or various other appropriate identifiers. User identifier 126 may include one or more attributes related to user 102, such as personal information related to user 102 (e.g., one or more user names, passwords, photograph images, biometric IDs, addresses, phone numbers, social security number, etc.). In various implementations, user identifier 126 may be passed with a user login request to service provider server 180 via network 160, and user identifier 126 may be used by service provider server 180 to associate user 102 with a particular user account maintained by service provider server 180.

In some embodiments, user device 120 includes a tracking device 128, such as a camera for tracking activity of user 102. Tracking device 128 generates tracking data that can be stored. Tracking device 128 can detect eye movement, lip movement, eyebrow movement, and forehead wrinkling by capturing images of user 102's movement as user 102 reads and otherwise interacts with content on a webpage.

For example, tracking device 128 can include an eye tracking device that can track eye movement via optical, electrical, magnetic, and/or other techniques. The eye tracking device is positioned to track the eyes of user 102 as he or she views information on user device 120. The eye tracking device is configured to measure the user 102's dwell time, that is, the time user 102 spent looking at a specific region of a webpage, and the user 102's pupil dilation while viewing the region. The eye tracking device captures and records the dwell time and dilation of the user 102's eyes while viewing a webpage.

In certain embodiments, user device 120 includes a display device (e.g., a computer monitor or screen) that is configured to display webpages and has tracking device 128 integrated therein. For example, a camera having eye tracking functionality may be placed in the bottom or top of the display device of user device 120. Any technique and/or devices known in the art for tracking eye movements can be used.

Wearable device 130, in various embodiments, is utilized by user 102 to monitor activity of user 102 and/or interact with user device 120. Wearable device 130 can transmit activity information (e.g., eye movement data, brainwave activity, lip movement data, forehead wrinkling data and/or eyebrow movement data) to user device 120, and user device 120 can, in turn, transmit this activity information to service provider server 180. Thus, wearable device 130 may communicate with service provider server 180 over network 160 via user device 120.

Wearable device 130, in other embodiments, is configured to communicate wirelessly over network 160. Wearable device 130 may be utilized by user 102 to interact with user device 120 and/or service provider server 180 over network 160. For example, user 102 may transmit activity information to user device 120 and/or service provider server 180 via wearable device 130.

Wearable device 130, in various embodiments, may be implemented using any appropriate combination of hardware and/or software configured for wired and/or wireless communication. In various implementations, the wearable device 130 includes at least one of a smart watch (e.g., Galaxy Gear™ from Samsung®, Pebble Steel™ from Pebble®), eyeglasses with appropriate computer hardware resources (e.g., Google Glass™ from Google®), and/or other types of wearable computing devices. In some embodiments, wearable device 130 includes eyegear configured to detect and measure eye movement. In several embodiments, wearable device 130 includes a wireless headset, helmet, headband, or other headgear that reads brainwaves. Wearable device 130 can then transmit or communicate the brainwaves to service provider server 180 for analysis. In certain embodiments, wearable device 130 includes electrodes configured to deliver a tactile notification (e.g., electric shock) to user 102 to alert user 102 that he or she has not spent enough time reading web content.

Service provider server 180, in various embodiments, may be maintained by a service provider that provides online services and/or processing for information and/or financial transactions. As such, service provider server 180 includes a service application 182, which may be adapted to interact with the user device 120 over the network 160 to facilitate the receipt and analysis of activity information from user device 120 and/or wearable device 130. In one example, service provider server 180 may be provided by a service provider such as PayPal®, Inc. of San Jose, Calif., USA.

The service provider server 180, in one embodiment, may be configured to maintain one or more user accounts and merchant accounts in an account database 184 each of which may include account information 186 associated with one or more individual users (e.g., user 102). For example, account information 186 may include private financial information of user 102, such as one or more account numbers, passwords, credit card information, banking information, or other types of financial information, which may be used to facilitate financial transactions between user 102 and a merchant. In various aspects, the methods and systems described herein may be modified to accommodate users and/or merchants that may or may not be associated with at least one existing user account and/or merchant account, respectively.

In one implementation, user 102 may have identity attributes stored with the service provider server 180, and user 102 may have credentials to authenticate or verify identity with the service provider server 180. User attributes may include personal information, banking information and/or funding sources. In various aspects, the user attributes may be passed to the service provider server 180 as part of a login, search, selection, purchase, and/or payment request, and the user attributes may be utilized by the service provider server 180 to associate user 102 with one or more particular user accounts maintained by the payment service provider server 180.

In various embodiments, service provider server 180 utilizes an activity tracker application 188 to determine if information on a webpage is both read and understood. In various embodiments, the activity tracker application 188 interprets activity data received from tracking device 128 and/or wearable device 130. For example, activity tracker application 188 can interpret eye movement data, brainwave activity data, lip movement data, forehead wrinkling data, and/or eyebrow movement data. In some embodiments, activity tracker application 188 provides a basic quiz to test comprehension of the information in instances where user 102 fails to spend a lot of time reading the information.

Eye movement data, in certain embodiments, is interpreted to identify elementary features. Eye movement data can be, for example, two-dimensional (x,y) eye gaze positions, three-dimensional (x,y,z) gaze positions, sample time (t), pupil diameter (d), whether the eye is open or closed, and/or other related information. Gaze information can include duration, latency and/or other information related to a particular gaze. Elementary features that are determined from the eye movement data can be, for example, fixations (position, time and/or duration), saccades (magnitude, direction and/or velocity), smoother pursuit motion (path taken by eye, velocity), and blinks (duration).

Eye movements can be classified into fixations, when the eye is relatively still and the brain processes information, and saccades, when the eye moves from one fixation point to the next and where the eye is moving more rapidly. Saccades are short in duration (e.g., less than 80 milliseconds) and fixations are longer (typically 250 milliseconds, but can be as short as 80-100 milliseconds).

Activity tracker application 188 typically maintains a record of user's 102 point of gaze at a given time for some range of time. For example, database 184 may store a record of everywhere user 102 looked for the past ten seconds and the time or how long user 102 looked there. Database 184 may also be used to store brainwave activity data, lip movement data, forehead wrinkling data, and/or eyebrow movement data. In various embodiments, the stored data can be used in disputes with user 102 regarding whether or not information was read and understood by user 102.

Activity tracker application 188 generally applies one or more algorithms to received data to determine whether or not user 102 read and understood text. For example, activity tracker application 188 applies one or more algorithms to eye movement data to extract fixations, dwell time, order in which areas are viewed, the time spent viewing each individual area, pupil dilation for each area or page, and to monitor the eye movements of the user 102 to determine what specific areas on a webpage are being viewed, for how long, and in what order the areas are being viewed.

Figure 2A:
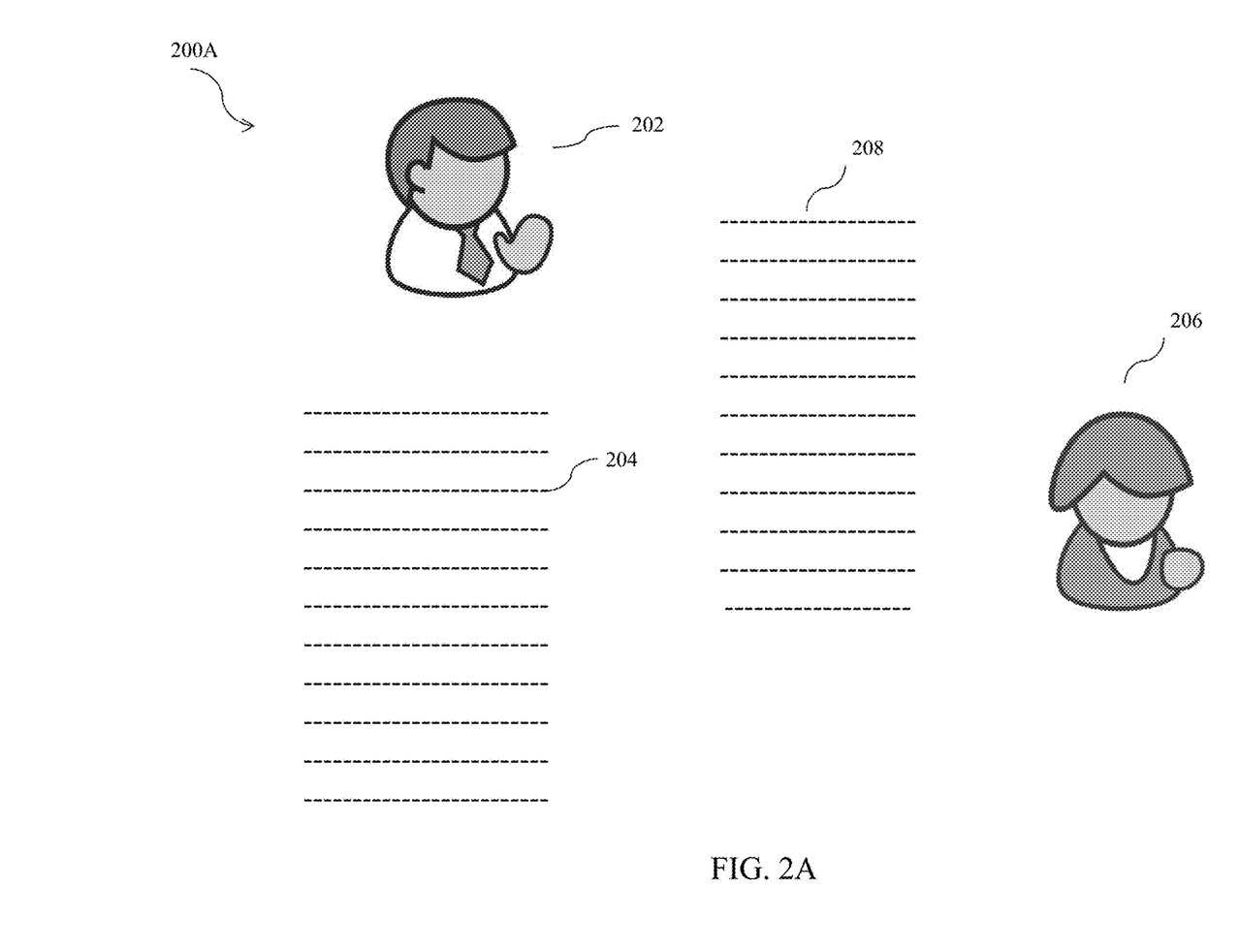
FIG. 2A is a webpage with content according to an embodiment of the present disclosure.

FIG. 2A presents a webpage 200A displayed on user device 120 that includes both textual and graphical fields. User 102 may first view area 202 that includes a picture for a period of time, which is generally not of concern. User 102 may then turn to view area 204 for a period of time. The metrics of user 102 viewing the area 204 is measured by tracking device 128 and/or wearable device 130. Specifically, tracking device 128 and/or wearable device 130 measure how long user 102 spent looking at area 204 and the user 102's pupil dilation when viewing area 204.

At some point in time, user 102 stops looking at area 204 and look at another area on the screen. The next area may be area 206 that includes another picture. After user 102 views area 206, user 102 may then turn to area 208. In similar fashion to the monitoring and recording process used when user 102 viewed area 204, tracking device 128 and/or wearable device 130 captures and records the dwell time and dilation of the user 102's eyes while viewing area 208.

In some embodiments, tracking device 128 and/or wearable device 130 also records the order or pattern that user 102 looked at the areas 202-208 on webpage 200A. This data can be stored, and/or one or more algorithms can be applied to the data to determine the areas on the webpage 200A that user 102 spent the most time, what order user 102 viewed the areas 202-208, and pupil dilation for each area 202-208.

Figure 2B:
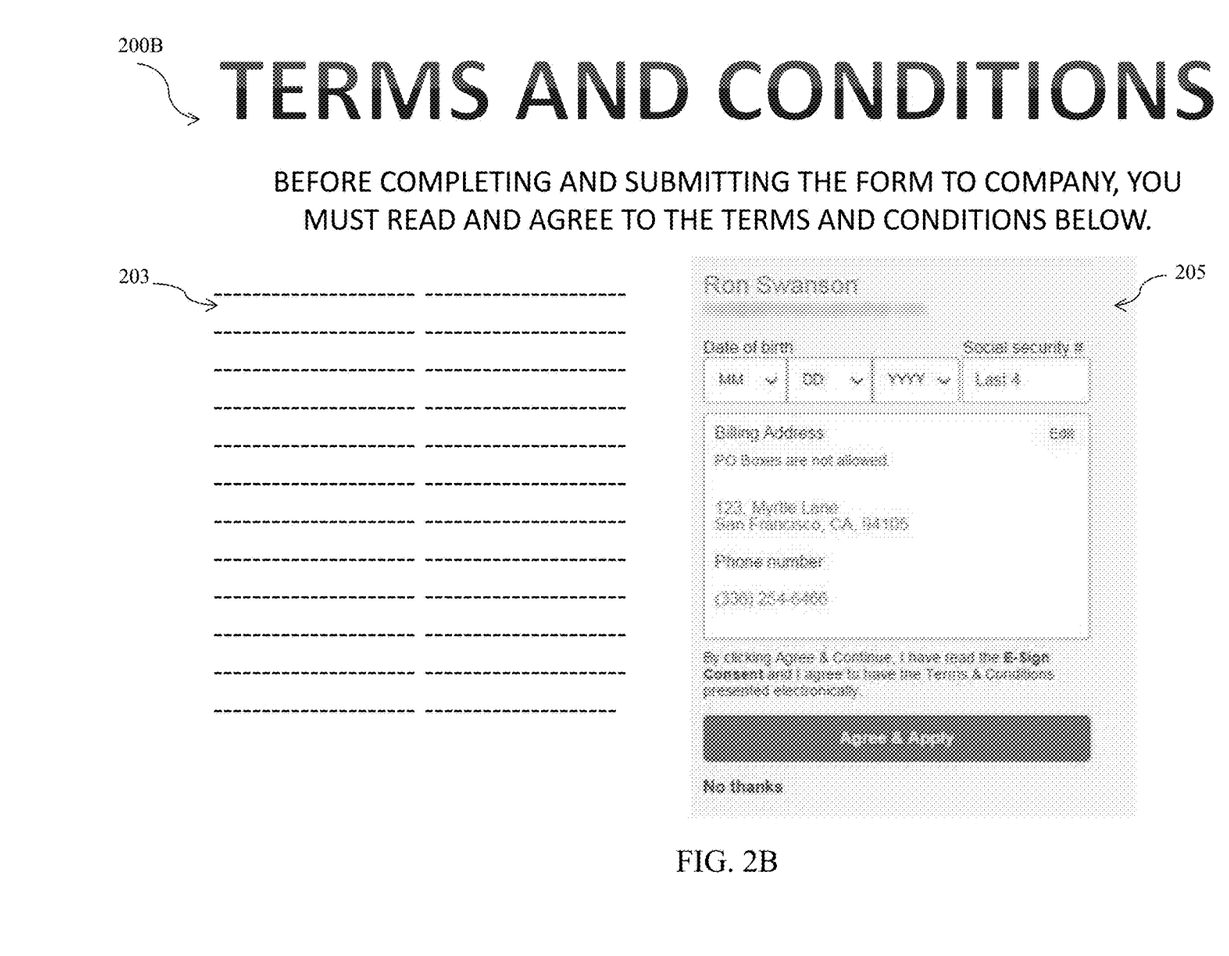
FIG. 2B is a webpage showing terms and conditions for a service that are displayed to a user according to an embodiment of the present disclosure.

FIG. 2B presents a webpage 200B displayed on user device 120 that includes textual fields that user 102 can observe. As viewers interact with webpage 200 by reading, navigating, clicking, or otherwise viewing webpage 200, tracking device 128, for example, a camera beneath a display device that displays webpage 200, collects activity data (e.g., eye movement data). In another embodiment, wearable device 130 collects activity data as user 102 interacts with webpage 200B.

As shown, webpage 200B includes text 203 that outlines terms and conditions, which typically include instructions, that user 102 should read and comprehend before proceeding with filling out and completing a form 205 to submit to a company. More often than not, user 102 skims quickly though text 203 without understanding what he or she is signing up for, fills out the form 205, and clicks on the "Agree and Apply" button.

In various embodiments, the systems and methods described herein prevent or stop user 102 from pressing the "Agree and Apply" button until user 102 has spent a sufficient time (e.g., a predetermined time based on length of text 203) reviewing text 203 and has understood text 203. In some embodiments, the service provider server 180 establishes or sets the minimum amount of time user 102 needs to review text 203. The time can be based, for example, on the complexity and length of text 203.

For example, should activity tracker application 188 receive eye movement data that indicates that user 102 has only spent 10 seconds reading text 203 when the predetermined time for review is 5 minutes, and the eye movement data further indicates that user 102's pupils have gotten smaller, activity tracker application 188 may prevent user 102 from entering information into form 205. For example, webpage 200B may include code that prevents the user 102 from continuing until it is determined by an algorithm that user 102 has sufficiently read text 203 (e.g. webpage 200B is "frozen"). Webpage 200B begins in a state that does not allow user 102 to continue. Only after information is received by activity tracker application 188 that sufficiently represents comprehension of text 203 by user 102 does webpage 200B change to an "unfrozen" state. In other embodiments, activity tracker application 188 sends an alert to user device 120 and/or wearable device 130. For example, activity tracker application 188 may cause an audio and/or visual signal to be emitted from user device 120 and/or wearable device 130. In one embodiment, activity tracker application 188 causes wearable device 130 to administer an electric shock to user 102.

Figure 3:
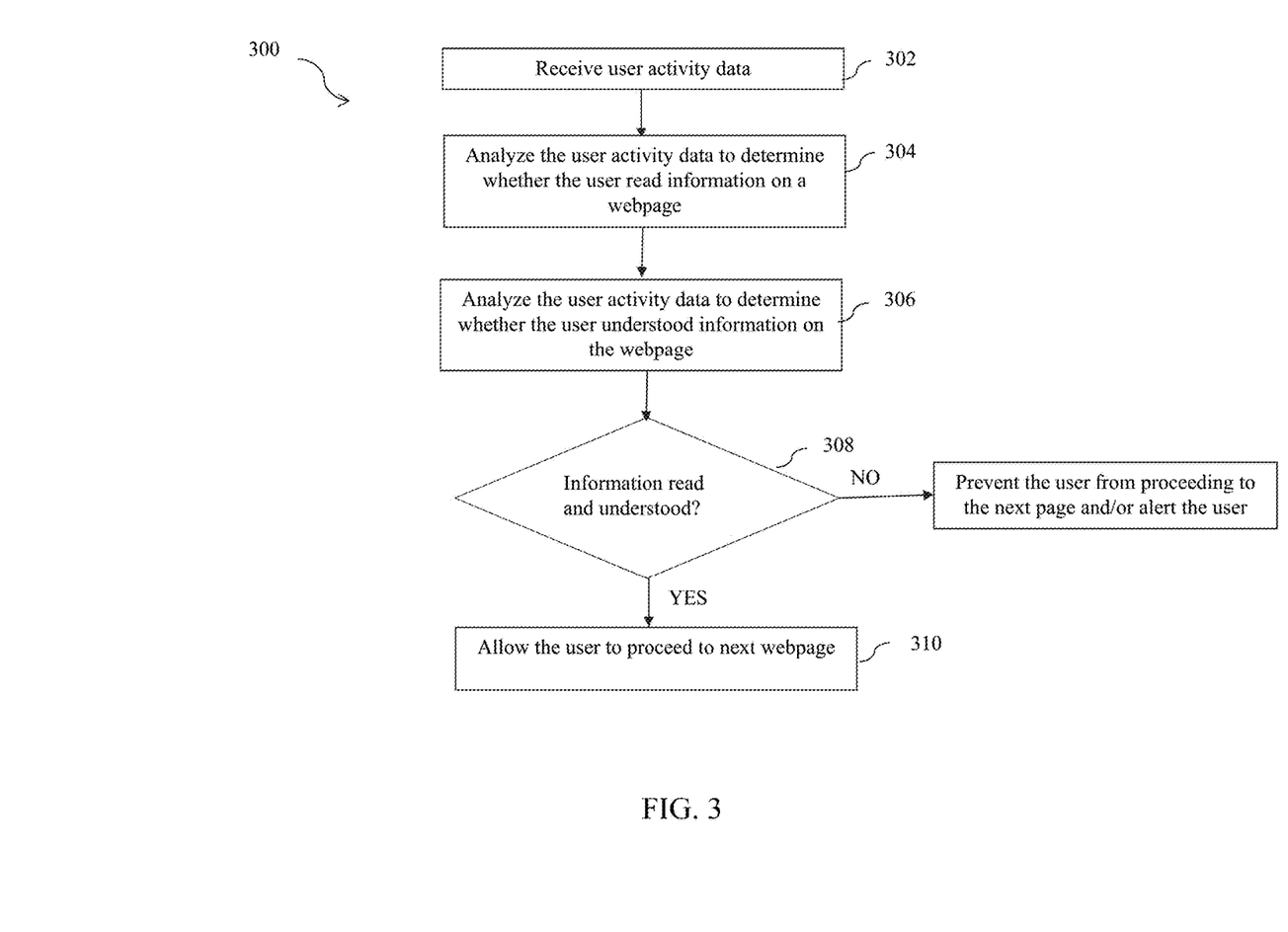
FIG. 3 is a flowchart showing a method of analyzing user activity on a GUI according to an embodiment of the present disclosure.

Referring now to FIG. 3, a flowchart of a method 300 of tracking user activity is described. The user 102 browses websites on user device 120 and stops on a webpage containing important instructions or information, such as terms and conditions of a service or terms and conditions for creating an account. In various embodiments, the service provider server 180 provides the content in the webpage.

As user 102 interacts with the webpage, tracking device 128 and/or wearable device 130 collect or gather user activity data. For example, eye movement data, brainwave activity data, lip movement data, forehead wrinkling data, and/or eyebrow movement data are collected. At step 302, tracking device 128 and/or wearable device 130 transmit and service provider server 180 receives the user activity data.

At step 304, service provider server 180 analyzes the user activity data to determine whether user 102 read the information presented on the webpage or not. In certain embodiments, when the user activity data includes eye movement data, the service provider server 180 determines one or more locations that user 102 viewed. The eye movement data generally includes information about how long user 102 looked at the information to help service provider server 180 determine if user 102 did in fact read the information. In some embodiments, the user activity data includes brainwave activity data, lip movement data, forehead wrinkling data, and/or eyebrow movement data. If the brainwave activity data includes beta brainwaves, then the service provider server 180 can conclude that user 102 was reading the information. If another type of brainwave is detected, however, such as alpha or theta brainwaves, the server 180 can deduce that user 102 was not reading or paying attention to the information. Similarly, if lip movement data, forehead wrinkling data, and/or eyebrow movement data show no lip movement, forehead wrinkling, and/or eyebrow movement, then service provider server 180 can deduce that user 102 did not read the information. Lip movement data can also be used to determine whether user 102 was reading the information or just babbling or singing to himself or herself.

At step 306, service provider server 180 analyzes the user activity data to determine whether user 102 understood the information presented on the webpage or not. For example, eye movement data can be analyzed to determine whether user 102's pupil dilation demonstrates that user 102 understood the information. Brainwave activity data can show beta brainwaves that demonstrate focus and concentration.

In some embodiments, a combination of the different types of activity data is received, and the combination is analyzed to determine whether user 102 read and understood the information. For example, eye movement data may be used to determine where user 102 is looking on a webpage and how long user 102 is looking at information on a webpage to evaluate whether user 102 read the information, and brainwave activity data may be used to determine whether user 102 understood the information. In another embodiment, brainwave activity data is used to determine whether user 102 read the information, and pupil dilation is used to determine whether user 102 understood the information. In yet another embodiment, lip movement data is used to determine whether user 102 read the information, and brainwave activity data and/or pupil dilation is used to determine whether user 102 understood the information.

In certain embodiments, the determination is based on a user profile or history. The user profile can include demographic information about user 102, including age, employment, and education. The user history can include history of user 102 with a company or entity, including how long user 102 has been a customer and if user 102 has had disputes or conflicts with the company or entity. In several embodiments, the user profile and history includes information regarding how fast user 102 reads (e.g., user 102 may be a speed reader, so that dwell time may not be an issue, contrasted with a very slow reader). Another factor that can be used in the determination include a user's particular experience with the content, such a user who has seen similar agreements in the past and may be able to quickly agree, while a first time user to such agreements will require more dwell time. Other factors can include size of display, size of content, location of the user, a user typically wearing glasses but not wearing them while looking at screen, time of day, type or importance of content, and any other factor that may vary how the system determines whether the user has read or understands what is being displayed.

If it is determined that user 102 both read and understood the information at step 308, service provider server 180 allows user 102 to proceed to the next webpage or access additional content at step 310. In other embodiments, user 102 may not have the read the information, but understood the information because user 102 had previously reviewed the information or reviewed similar information. In these situations, user 102 would also be allowed to proceed. Should user 102 fail, however, to read and/or understand the information at step 308, service provider server 180 at step 312 prevents user 102 from proceeding and/or notifies user 102 that he or she needs to read and understand the information.

Advantageously, the described systems and methods help ensure that important information on webpages are both read and understood by viewers of the information. This can lower the number of disputes and misunderstandings between users and companies so that less time is spent on complaints. Customer satisfaction is increased and companies can spend their time on more important things.

The described systems and methods utilize specialized devices to collect and gather user activity data. The data, in some embodiments, is entered into algorithms configured to output how long a user looked at a specific region, the order that the user viewed content on a webpage, and the pupil dilation as the user viewed the different areas. The systems and methods do not merely use algorithms or mathematical formulae, but use the results of the algorithms to change or alter the functioning of a webpage to prevent a user from accessing additional content.

Figure 4:
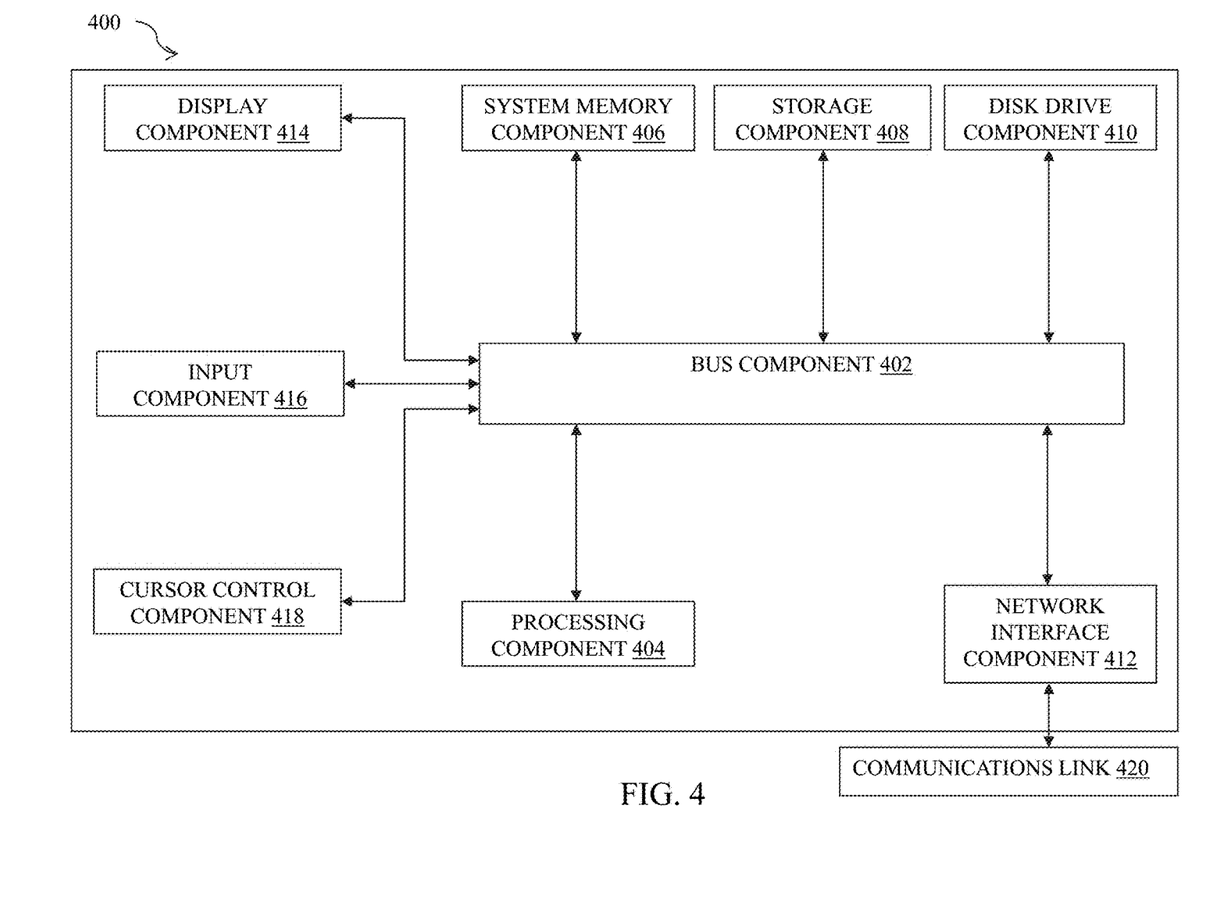
FIG. 4 is a block diagram of a system for implementing one or more components in FIG. 1 according to an embodiment of the present disclosure.

Referring now to FIG. 4 a block diagram of a system 400 is illustrated suitable for implementing embodiments of the present disclosure, including user device 120, wearable device 130, and service provider server or device 180. System 400, such as part of a cell phone, a tablet, a personal computer and/or a network server, includes a bus 402 or other communication mechanism for communicating information, which interconnects subsystems and components, including one or more of a processing component 404 (e.g., processor, micro-controller, digital signal processor (DSP), etc.), a system memory component 406 (e.g., RAM), a static storage component 408 (e.g., ROM), a network interface component 412, a display component 414 (or alternatively, an interface to an external display), an input component 416 (e.g., keypad or keyboard), and a cursor control component 418 (e.g., a mouse pad).

In accordance with embodiments of the present disclosure, system 400 performs specific operations by processor 404 executing one or more sequences of one or more instructions contained in system memory component 406. Such instructions may be read into system memory component 406 from another computer readable medium, such as static storage component 408. In other embodiments, hardwired circuitry may be used in place of or in combination with software instructions for implementation of one or more embodiments of the disclosure.

Logic may be encoded in a computer readable medium, which may refer to any medium that participates in providing instructions to processor 404 for execution. Such a medium may take many forms, including but not limited to, non-volatile media, volatile media, and transmission media. In various implementations, volatile media includes dynamic memory, such as system memory component 406, and transmission media includes coaxial cables, copper wire, and fiber optics, including wires that comprise bus 402. Memory may be used to store user information. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 400. In various other embodiments, a plurality of systems 400 coupled by communication link 420 (e.g., network 160 of FIG. 1, LAN, WLAN, PTSN, or various other wired or wireless networks) may perform instruction sequences to practice the disclosure in coordination with one another. Computer system 400 may transmit and receive messages, data, information and instructions, including one or more programs (i.e., application code) through communication link 420 and communication interface 412. Received program code may be executed by processor 404 as received and/or stored in disk drive component 410 or some other non-volatile storage component for execution.

Although various components and steps have been described herein as being associated with user device 120, wearable device 130, and service provider server or device 180 of FIG. 1, it is contemplated that the various aspects of such servers illustrated in FIG. 1 may be distributed among a plurality of servers, devices, and/or other entities.

Where applicable, various embodiments provided by the present disclosure may be implemented using hardware, software, or combinations of hardware and software. Also where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

Software in accordance with the present disclosure, such as program code and/or data, may be stored on one or more computer readable mediums. It is also contemplated that software identified herein may be implemented using one or more specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, mobile device, server, and other devices described herein.

What is claimed is:

1. A system for analyzing user activity on a graphical user interface (GUI) comprising:
a non-transitory memory; and
one or more hardware processors coupled to the non-transitory memory and configured to read instructions from the non-transitory memory to cause the system to perform operations comprising:
presenting, on a display of a user device of a user, a first webpage comprising content, an electronic form, and an interactive element for redirecting to a second webpage;
configuring the first webpage according to a first interactive state by disabling the electronic form and the interactive element, wherein the disabled electronic form prevents any data to be inserted into the electronic form;
receiving user comprehension data indicating a dwell time and a pupil dilation of the user when the user is reading a text portion of the content from at least one of a camera or a wearable device;
accessing a user profile associated with the user;
based on the user profile, the dwell time, and the pupil dilation, determining whether the user has read the text portion of the content;
in response to determining that the user has read the text portion of the content, reconfiguring the first webpage according to a second interactive state by enabling the electronic form and the interactive element;
receiving a selection of the interactive element from the user device; and
in response to receiving the selection of the interactive element, causing the user device to present the second webpage based on data received via the electronic form.

2. The system of claim 1, wherein the content comprises at least one of instructions or terms and conditions for creating an account.

3. The system of claim 1, wherein the user comprehension data is received from the wearable device, and wherein the wearable device comprises a headgear configured to read brainwaves.

4. The system of claim 1, wherein the user profile comprises at least one of demographic information of the user, information indicating how fast the user reads, or information indicating experiences the user has with the content.

5. The system of claim 1, wherein the operations further comprise establishing a minimum dwell time on the portion of the content.

6. The system of claim 5, wherein the operations further comprise comparing the minimum dwell time to the dwell time.

7. The system of claim 1, wherein configuring the first webpage according to the first interactive state comprises freezing the first webpage.

8. The system of claim 1, wherein the user device is a first user device, and wherein the operations further comprise in response to determining that the user may not have read or understood the portion of the content based on the user profile, the dwell time, and the pupil dilation, transmitting a notification to a second user device different from the first user device that presents the first webpage.

9. The system of claim 1, wherein disabling the interactive element comprises causing the interactive element to be invisible on the first webpage rendered on the user device.

10. The system of claim 1, wherein the electronic form includes a drop-down menu, wherein disabling the electronic form further includes deactivating the drop-down menu.

11. The system of claim 8, wherein the notification comprises at least one of a ring tone, an audio message, a video message, or a tactile alert.

12. A method of analyzing user activity on a graphical user interface (GUI) comprising:
    presenting, by one or more hardware processors associated with a service provider, a first webpage on a display of a user device of a user, wherein the first webpage comprises text content, an electronic form, and an interactive element for redirecting to a second webpage;
    configuring, by the one or more hardware processors, the first webpage according to a first interactive state by disabling the electronic form and the interactive element, wherein the disabled electronic form disallows any data to be inserted into the electronic form;
    receiving, by the one or more hardware processors, user activity data related to interactions of the user with the text content of the first webpage;
    based on the received user activity data, determining, by the one or more hardware processors, whether the user has read the text content on the first webpage;
    in response to determining that the user has read the text content on the first webpage, reconfiguring, by the one or more hardware processors, the first webpage according to a second interactive state by enabling the electronic form and the interactive element;
    receiving, by the one or more hardware processors, a selection of the interactive element from the user device; and
    in response to receiving the selection of the interactive element, causing the user device to present the second webpage based on data received via the electronic form by the user.

13. The method of claim 12, wherein the user activity data comprises at least one of eye movement data, brainwave activity data, lip movement data, forehead wrinkling data, or eyebrow movement data.

14. The method of claim 12, wherein the received user activity data comprises eye movement data and brainwave activity data.

15. The method of claim 12, wherein the received user activity data comprises lip movement data and eye movement data.

16. The method of claim 12, wherein the electronic form includes a drop-down menu, wherein disabling the electronic form further includes deactivating the drop-down menu.

17. A non-transitory machine-readable medium having stored thereon machine-readable instructions executable to cause a machine to preform operations comprising:
    presenting a first webpage on a display of a user device of a user, wherein the first webpage comprises text content, an electronic form, and an interactive element for redirecting to a second webpage;
    configuring the first webpage according to a first interactive state by disabling the electronic form and the interactive element, wherein the disabled electronic form prevents any data to be inserted into the electronic form;
    receiving user activity data indicating interactions of the user with the text content on the first webpage;
    based on the received user activity data, determining whether the user has read the text content on the first webpage;
    in response to determining that the user has read the text content on the first webpage, reconfiguring, by the one or more hardware processors, the first webpage according to a second interactive state by enabling the electronic form and the interactive element;
    receiving a selection of the interactive element from the user device; and
    in response to receiving the selection of the interactive element, presenting on the user device the second webpage based on data received via the electronic form.

18. The non-transitory machine-readable medium of claim 17, wherein the user activity data comprises at least one of eye movement data, brainwave activity data, lip movement data, forehead wrinkling data, or eyebrow movement data.

19. The non-transitory machine-readable medium of claim 17, wherein the operations further comprise in response to determining that the user has not read the content within a predetermined period of time, providing a tactile alert on the user device, wherein the tactile alert comprises at least one of a vibration or an electric shock.

20. The non-transitory machine-readable medium of claim 17, wherein the electronic form includes a drop-down menu, wherein disabling the electronic form further includes deactivating the drop-down menu.

* * * * *

UNITED STATES PATENT AND TRADEMARK OFFICE
CERTIFICATE OF CORRECTION

PATENT NO. : 10,379,709 B2
APPLICATION NO. : 15/094812
DATED : August 13, 2019
INVENTOR(S) : Michael Charles Todasco Page 1 of 1

It is certified that error appears in the above-identified patent and that said Letters Patent is hereby corrected as shown below:

In the Claims

In Column 14, Line 13 delete "preform" and add "perform"

In Column 14, Line 29 delete "by the one"

In Column 14, Line 30 delete "or more hardware processors,"

Signed and Sealed this
Fifth Day of November, 2019

Andrei Iancu
*Director of the United States Patent and Trademark Office*